United States Patent
Oriakhi et al.

(10) Patent No.: US 9,356,298 B2
(45) Date of Patent: May 31, 2016

(54) ABRASION RESISTANT SOLID OXIDE FUEL CELL ELECTRODE INK

(71) Applicant: Bloom Energy Corporation, Sunnyvale, CA (US)

(72) Inventors: Chris Oriakhi, Sunnyvale, CA (US); Andres Leming, Sunnyvale, CA (US); Shailendra Parihar, Santa Clara, CA (US); Richard Stephenson, Sunnyvale, CA (US); Emad El Batawi, Sunnyvale, CA (US)

(73) Assignee: BLOOM ENERGY CORPORATION, Sunnnyvale, CA (US)

( * ) Notice: Subject to any disclaimer, the term of this patent is extended or adjusted under 35 U.S.C. 154(b) by 47 days.

(21) Appl. No.: 14/201,149

(22) Filed: Mar. 7, 2014

(65) Prior Publication Data

US 2014/0272114 A1    Sep. 18, 2014

Related U.S. Application Data

(60) Provisional application No. 61/787,111, filed on Mar. 15, 2013.

(51) Int. Cl.
*H01M 4/88* (2006.01)
*H01M 4/86* (2006.01)
(Continued)

(52) U.S. Cl.
CPC .......... *H01M 4/8832* (2013.01); *H01M 4/8668* (2013.01); *H01M 4/881* (2013.01); *H01M 8/124* (2013.01); *H01M 4/8882* (2013.01); *H01M 4/9033* (2013.01); *H01M 2008/1293* (2013.01); *Y02E 60/522* (2013.01); *Y02E 60/525* (2013.01); *Y02P 70/56* (2015.11)

(58) Field of Classification Search
CPC .......... H01M 8/10; H01M 2008/1095; H01M 2300/0082
USPC ........ 427/115, 379, 553, 557, 558; 252/182.1
See application file for complete search history.

(56) References Cited

U.S. PATENT DOCUMENTS

| 5,314,711 | A  | 5/1994 | Baccini |
| 6,228,521 | B1 | 5/2001 | Kim et al. |
| 6,399,233 | B1 | 6/2002 | Milliken et al. |

(Continued)

FOREIGN PATENT DOCUMENTS

| JP | 53051213 A  | 5/1978 |
| JP | 2005050755 A | 2/2005 |

(Continued)

OTHER PUBLICATIONS

International Search Report and Written Opinion received in connection with International Application No. PCT/US2014/021676, mailed Jun. 26, 2014.

(Continued)

*Primary Examiner* — Michael Cleveland
*Assistant Examiner* — Tabassom Tadayyon Eslami
(74) *Attorney, Agent, or Firm* — The Marbury Law Group PLLC

(57) ABSTRACT

A method for forming a solid oxide fuel cell (SOFC) includes co-firing the anode and cathode electrode layers, which involves placing an unfired anode onto a surface during the cathode print cycle. To avoid damage to the electrolyte and cathode production cycle by the green anode ink, an abrasion resistant ink is used to print the anode electrode layer.

4 Claims, 2 Drawing Sheets

(51) Int. Cl.
*H01M 8/12* (2016.01)
*H01M 4/90* (2006.01)

(56) References Cited

U.S. PATENT DOCUMENTS

| | | |
|---|---|---|
| 6,682,842 B1 | 1/2004 | Visco et al. |
| 6,905,732 B1 | 6/2005 | Dunshee et al. |
| 6,936,123 B2 | 8/2005 | Iseki et al. |
| 6,972,161 B2 | 12/2005 | Beatty et al. |
| 7,485,385 B2 | 2/2009 | Seccombe et al. |
| 8,449,702 B2 | 5/2013 | Batawi et al. |
| 8,617,763 B2 | 12/2013 | Armstrong et al. |
| 2003/0077504 A1 | 4/2003 | Hara et al. |
| 2003/0082434 A1 | 5/2003 | Wang et al. |
| 2004/0018409 A1 | 1/2004 | Hui et al. |
| 2006/0115709 A1 | 6/2006 | Badding et al. |
| 2006/0159983 A1 | 7/2006 | Song |
| 2006/0166070 A1 | 7/2006 | Hickey et al. |
| 2007/0077476 A1* | 4/2007 | Lee et al. .................. 429/30 |
| 2008/0096080 A1 | 4/2008 | Batawi et al. |
| 2008/0261099 A1 | 10/2008 | Nguyen et al. |
| 2009/0023027 A1* | 1/2009 | Hata .......................... 429/27 |
| 2009/0110992 A1 | 4/2009 | Nguyen |
| 2009/0136821 A1 | 5/2009 | Gottmann et al. |
| 2010/0028540 A1 | 2/2010 | Seong et al. |
| 2012/0043010 A1* | 2/2012 | Batawi et al. ............. 156/89.12 |
| 2013/0011768 A1* | 1/2013 | Ahn ........................... 429/506 |
| 2013/0309597 A1 | 11/2013 | Batawi et al. |

FOREIGN PATENT DOCUMENTS

| | | |
|---|---|---|
| JP | 2005/228740 A | 8/2005 |
| JP | 2007001786 A | 1/2007 |

OTHER PUBLICATIONS

Boccaccini, Aldo R., et al., "Application of electrophoretic and electrolytic deposition techniques in ceramics processing", Solid State and Materials Sci., vol. 6 (3), 2002, pp. 251-260.

Kwon, Ohchul et al., "Particle states in plasma and their effects on properties of Ni/YSZ spray coatings for SOFC anode applications", Journal of Ceramic Processing Research, vol. 10 (2) 2009, pp. 139-143.

Somalu Mahendra R. et al., "Rheological studies of nickel/scandia-stabilized-zirconia screen printing inks for solid oxide fuel cell anode fabrication", Journal of the American Ceramic Society, vol. 95 (4), 2012, pp. 1220-1228.

International Search Report and Written Opinion, International Application No. PCT/US2011/047976, dated Mar. 19, 2012.

* cited by examiner

ABRASION RESISTANT SOLID OXIDE FUEL CELL ELECTRODE INK

CROSS REFERENCE TO RELATED APPLICATION

This application claims the benefit of priority to U.S. Provisional Patent Application Ser. No. 61/787,111 entitled "Abrasion Resistant Solid Oxide Fuel Cell Electrode Ink" filed Mar. 15, 2013, which is incorporated herein by reference in its entirety.

FIELD OF THE INVENTION

The present invention is generally directed to fuel cell components, and to solid oxide fuel cell anode materials in particular.

BACKGROUND

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer in a fuel cell or discharge mode and generates the fuel and oxidant using electrical energy in an electrolysis or charge mode.

SUMMARY OF THE INVENTION

An embodiment method of making a SOFC includes: forming a first electrode on a first side of a planar solid oxide electrolyte using an abrasion resistant ink; drying the first electrode; forming a second electrode on a second side of the solid oxide electrolyte prior to firing the first electrode; drying the second electrode; and firing the first and second electrodes during a single firing step.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

In several types of SOFC fabrication schemes, electrodes are applied to a fuel cell component and then fired at high temperature. Typically, SOFC electrodes go through several processing steps between the application of the electrode to the fuel cell and the eventual electrode firing step. In particular, in schemes in which both electrodes are applied without firing, cross-contamination, or abrasion, may occur between the electrodes, leading to reduced cell performance.

The various embodiments provide methods and systems for improving abrasion resistance of an electrode by altering the composition of the ink used to print its one or more sublayers.

As used herein, the terms "about" and "around", when describing a value or range of values, are used interchangeably to refer to a deviation of plus or minus 10%, such as plus or minus 1-5%.

A SOFC anode electrode may be formed by depositing a first anode sublayer over the first side of a ceramic electrolyte, allowing the first sublayer to dry at relatively low temperature, and then optionally depositing a second anode sublayer on top of the dried but unfired first anode sublayer. A SOFC cathode electrode may be formed by depositing a first cathode sublayer over the opposite second side of the electrolyte, allowing the first sublayer to dry at relatively low temperature, and then optionally depositing a second cathode sublayer on top of the dried but unfired first cathode sublayer. The electrodes may contain more than two sublayers if desired. Sublayer deposition of the anode and cathode inks may be performed using spraying, tape calendaring, tape casting, solution casting, ink jet printing or screen printing with calendared mesh that has a high wire density.

Typically the anode sublayers may be fired either individually or in a single anode layer firing. Similarly, the cathode sublayers may typically be fired either individually or in a single cathode layer firing. In a preferred embodiment, the anode layer and the cathode layer may both be fired at the same time (i.e., "co-fired"). For example, following the deposition and drying of the anode sublayers, instead of firing the anode, the electrolyte may be turned upside down placed on a support (e.g., conveyor, moving arm, platform, etc.) and taken to the cathode printing station. At the printing station, one or more cathode sublayers may be deposited and dried. The electrolyte substrate containing both dried anode and cathode electrode layers may then be provided into a furnace or another heating apparatus (e.g., heat lamp, heating apparatus, etc.) that co-fires the anode and cathode layers during the same step.

Figure 1:
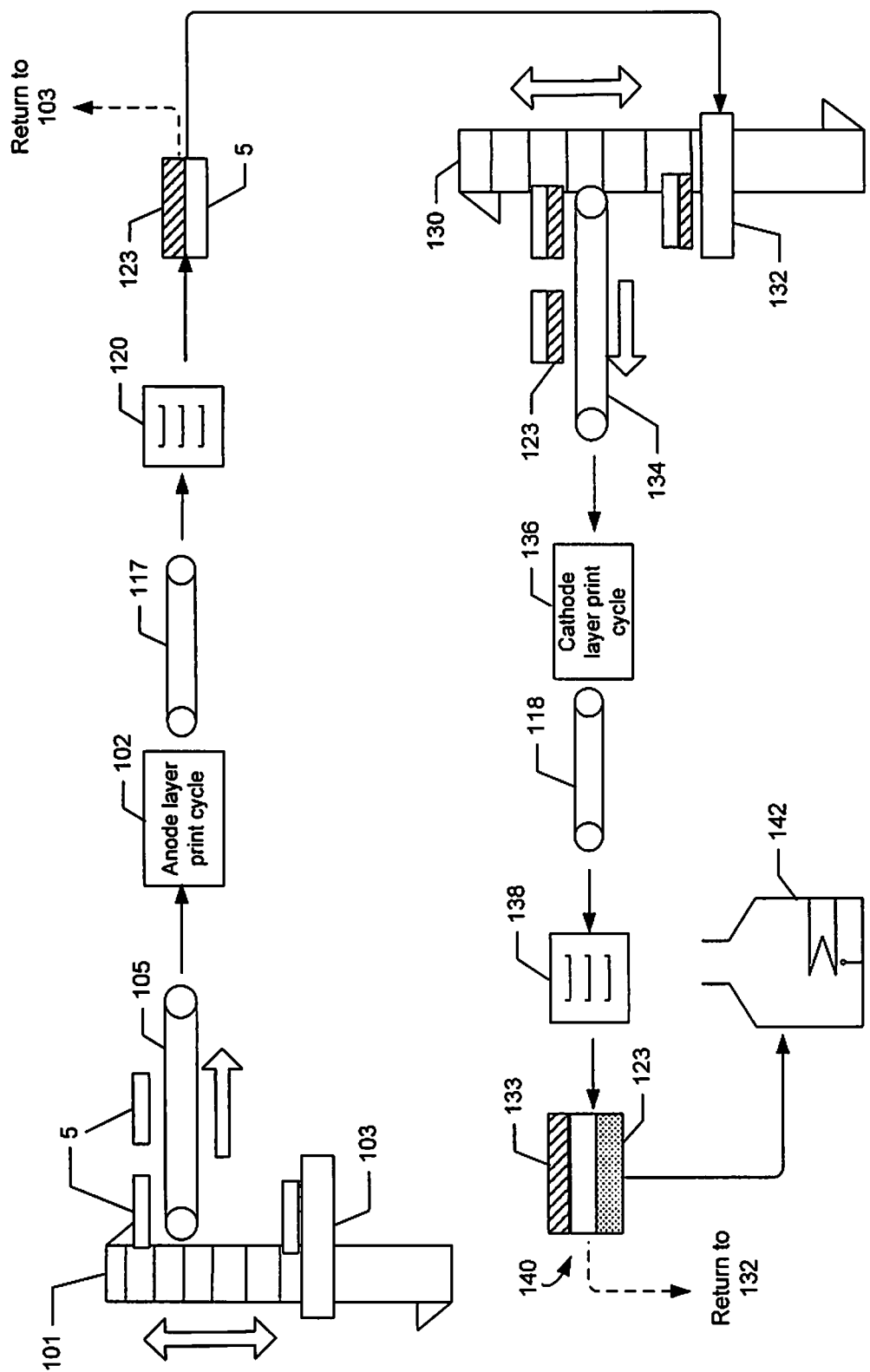
FIG. 1 is schematic representation of the apparatus and method steps used to fabricate a SOFC using co-firing of the anode and cathode layers.

FIG. 1 illustrates a method of making the anode and cathode electrodes by co-firing that is suitable for use with the various embodiments.

Bare, plate shaped solid oxide electrolytes 5, such as scandia or yttria stabilized zirconia electrolytes may be unpackaged and placed into a slotted cassette 101. Each cassette may be installed into an elevator 103 which positions the individual electrolyte substrate 5 onto a walking beam conveyor 105. The walking beam conveyor may transport the electrolyte substrates 5 for an anode print layer cycle 102. In an embodiment, the electrolyte substrate may be placed onto a printing tool plate by a pick-up head. In an embodiment, a pick up head may be configured with a Bernoulli pad or vacuum pogo pin array to pick up the electrolyte substrate.

Once the substrate is positioned, anode ink may be printed onto the substrate to form an anode sublayer. In an embodiment, the anode print cycle may be implemented as a tape calendaring, tape casting, solution casting, ink jet printing, spraying or screen printing process using suitable equipment (e.g., a calendared mesh with a high wire density for screen printing). Various process parameters may be adjusted to achieve a desired layer deposition thickness and quality.

After the anode screen print cycle is completed, the printed electrolyte substrate 5 may be lifted, either manually or by any suitable machine or device, and transported for drying. In an embodiment, the printed electrolyte substrate 5 may be released onto a dryer belt 117. A dryer may employ any suitable drying mechanism, for example, a drying process that uses infrared heating, ultraviolet lamps, thermal (e.g., furnace) heating, etc. The electrolyte substrate 5 may be transported by the belt 117 to a dryer 120, which may have one or multiple heating zones.

The dried electrolyte with first anode sublayer may be removed from the dryer 120, either manually or by machine, and may be returned to the elevator 103 of the screen printing station for deposition of a second anode sublayer. The formation of a second anode sublayer on the first anode sublayer may repeat the same printing and drying steps used to form the first anode sublayer. In another embodiment, the electrodes may contain more than two sublayers, and if desired the electrolyte with two anode sublayers may be returned to the elevator 103 for one or more additional cycles to form than two anode sublayers. In another embodiment, the anode may be only one layer, therefore requiring only one anode printing cycle and one drying cycle. After the printing and drying of the one or more anode sublayers, the substrate 5 with a printed, unfired anode layer 123 may be transported to a cathode screen print cycle. Similar to the anode print station, cassettes 130 may be installed into an elevator 132, which may position individual electrolyte substrates 5 with printed, unfired anode layers 123 facing down on a walking beam conveyor 134 (i.e., the unfired anode layer 123 contacting (e.g., lying flat on) the support, such as conveyer 134). The walking beam conveyor may transport the substrates for a cathode layer print cycle 136. In order to perform the cathode printing on the second side of the electrolyte, the substrate may be placed on the belt of walking beam conveyer 134 such that the printed anode layer on the first side faces the belt.

A cathode layer (e.g., one or more cathode sublayers) 133 may be deposited using tape calendaring, tape casting, solution casting, ink jet printing, spraying or screen printing onto the second side using ink based processes that are similar to those used to form the anode layer. In an embodiment, the anode and cathode print cycles 102, 136 are performed using the same print station. In another embodiment, these cycles are performed using separate anode and cathode print stations.

After the cathode print cycle, the cathode layer or sublayers 133 may be may be transported by a dryer belt 118 to a dryer 138, which may have one or multiple heating zones. The dried electrolyte 138 with an unfired anode layer 123 and dried cathode sublayer may be removed from the dryer 120, either manually or by machine, and may be returned to the elevator 132 of the screen printing station for deposition of a second cathode sublayer. The formation of a second cathode sublayer on the first cathode sublayer may repeat the same printing and drying steps used to form the first cathode sublayer. In another embodiment, the electrodes may contain more than two sublayers, and if desired the electrolyte with two cathode sublayers may be returned to the elevator 132 for one or more additional cycles to form more than two cathode sublayers. In another embodiment, the cathode may be only one sublayer, therefore requiring only one cathode printing cycle and drying cycle. In alternative embodiments, the order of the cathode and anode printing cycles may be reversed (i.e., formation of the cathode layer before formation of the anode layer).

After the cathode printing and drying steps, an unsintered solid oxide fuel cell 140 (e.g., with unfired/unsintered anode 123 and cathode 133) may be provided to a heating apparatus, such as a furnace 142 in which the anode and cathode are fired at the same time (i.e., "co-fired"). Co-firing may include, for example, both binder burnout and electrode sintering, which may be performed using a single high temperature furnace. The anode and cathode drying steps in the various embodiments may employ any of a variety of curing techniques (e.g., thermal curing, ultraviolet curing, infrared curing, etc.) to cross-link and/or interlock chains of a polymer binder in the inks. Each drying cycle may take place over a relatively short period of time, for example, 2 to 20 minutes. In an embodiment, the drying steps may be conducted at a temperature of 150° C. or less, such as 100° to 150° C. In contrast, the co-firing of the anode and cathode electrodes may be conducted at a temperature of 1000° to 1300° C., and may take one to six hours for completion.

In an embodiment, prior to co-firing the unsintered oxide fuel cell 140 may be stacked with other unsintered solid oxide fuel cells formed using the same methods, making a SOFC stack that is fired in the furnace 140. In this manner, a cathode electrode may be formed on a first side of a planar solid oxide electrolyte, and the anode electrode may be formed on the second side of the planar solid oxide electrolyte.

While the co-firing of the anode and cathode layers may save time and energy, it introduces a problem of abrasion (i.e., scuffing) for the anode electrode due to the substrate being placed with the anode layer side down on the conveyor belt during the printing and drying of the at least one cathode sublayer. That is, the printed and dried anode which is still in a green state may scatter loose powder from the anode ink and cross-contaminate the deposition of the cathode material before firing.

The various embodiments improve SOFC production processes that involve co-firing of the anode and cathode layers by altering the existing anode ink formulation, thereby increasing the strength of the green electrode. In particular, the various embodiments provide for the creation of an electrode layer, such as an anode layer with abrasion resistant qualities.

Figure 2:
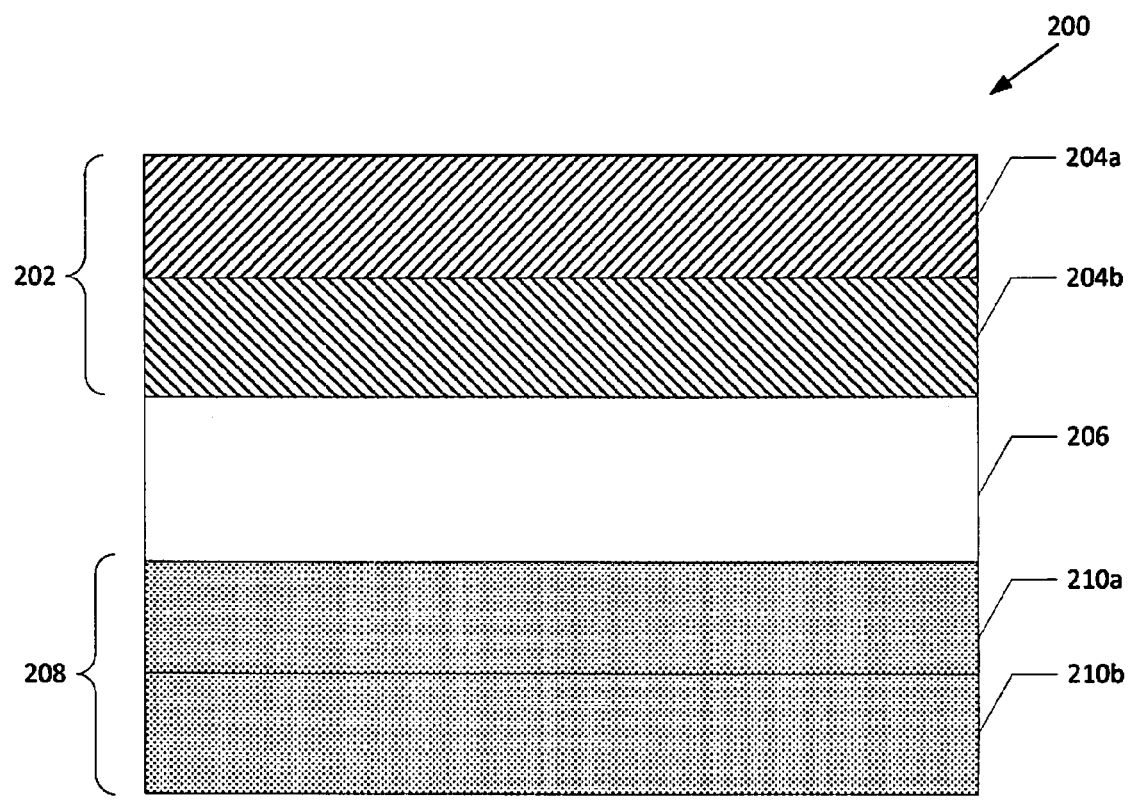
FIG. 2 illustrates a side cross-sectional view of an embodiment SOFC.

FIG. 2 illustrates an example SOFC 200 with multiple anode and cathode sublayers according to the various embodiments. The cell 200 may include an anode electrode 202, a solid oxide electrolyte 206 and a cathode electrode 208. The electrolyte 206 may comprise a stabilized zirconia, such as scandia stabilized zirconia (SSZ) or yttria stabilized zirconia (YSZ). Alternatively, the electrolyte 206 may comprise another ionically conductive material, such as a doped ceria.

In one embodiment, the anode electrode 202 may be composed of one layer, or may be several separately deposited sublayers (e.g., sublayers 204a, 204b). Similarly, the cathode electrode 208 may be composed of one layer, or may be several separately deposited sublayers (e.g., sublayers 210a, 210b).

An abrasion resistant anode may be fabricated by using an abrasion resistant ink print the anode electrode layer or sublayers. Any suitable ink processing, ink deposition, such as screen printing described above, and firing/sintering steps, such as the ones described above, may be used for anode fabrication. In the various embodiments, an abrasion resistant ink may contain an abrasion resistant binder. Other components of the abrasion resistant ink may include a composite fine powder (e.g., ceramic and/or metal precursor powder for forming a cermet or ceramic electrode), an optional dispersant, an optional plasticizer and a solvent.

Binders suitable for use in the various embodiments may include one or more abrasion resistant polymers or polymer precursors (e.g., monomers) which are polymerized during the electrode processing. Any suitable polymers (e.g., polymer resins) may be used, such as acrylic polymers, siloxanes, ethyl cellulose, polyvinyl alcohol, polyvinyl butyral, and other suitable polymer binders and their mixtures. In an embodiment, the acrylic polymer may be formed using acrylate monomers, for example, methacrylates (e.g., methyl methacrylate, butyl methacrylate, hydroxyethyl methacrylate, etc.) or acrylates (e.g., methyl acrylate, ethyl acrylate, 2-ethylhexyl acrylate, butyl acrylate, etc.) These acrylic polymers may be obtained from a commercial polymer manufacturer under any of a variety of trade names (e.g., Elvacite® acrylic resins, by Lucite International).

Alternatively, the binder may comprise a polymer matrix material that is used in liquid crystal display inks, such as any material described in U.S. Patent Application publication number 2010/0028540 A1. This matrix material may be selected from the group consisting of polypropylene, poly(N-butylmethacrylate), poly(laurylmethacrylate), polyethylene, polyisobutylene, polyvinylfluoride, polytrifluoroethylene, polychlorotrifluoroethylene, polyoctylmethacrylate, polyvinylacetate, polyethylacrylate, polyethylmethacrylate, polyisobutylmethacrylate, polybutylacrylate, poly(t-butylmethacrylate), polymethacrylonitrile, polyhexylmethacrylate, polypropylmethacrylate, polyethylhexylacrylate, polytetramethyleneoxide, polyphenylmethacrylate, polystearylmethacrylate, polycarbonate, polyvinylidenefluoride, polybenzylmethacrylate, polyepichlorohydrin, nitrocellulose, cellulose acetate butyrate, polyoxymethylene, polypropyleneoxide, nylon 11, nylon 10,10, nylon 88, nylon 99, polydiethylsiloxane, polymethylphenylsiloxane, poly(di-n-hexylsilane), poly(di-n-propylsilane), poly(di-n-butylsilane), polycyclohexylmethyl, polydimethylsilane, poly(paratoluenemethylsilane), polyphenylethylsilane, and their mixtures.

Alternatively, the binder may be provided into the ink composition in a polymer precursor form, such as in monomer form (e.g., acrylate monomers), which are polymerized before or during the electrode drying step.

The polymer material used to make a binder may have a structure that promotes formation of a matrix in the polymer structure. The use of a polymeric binder, such as an acrylic or other matrix forming polymer binder may substantially increase abrasion resistance of the anode electrode ink in comparison to binders that are ordinarily used. Without wishing to be bound to a particular theory, the inventors attribute this abrasion resistance to cross-linking and/or polymer chain interlocking, in the acrylic polymer prior to its inclusion in the ink, and/or cross-linking that occurs after its inclusion in the ink, for example as a result of the drying/curing step(s). In this manner, the polymer may form a matrix which contains the dispersed precursor powder, thereby providing abrasion resistance. Thus, in an alternative embodiment, any suitable thermoset resin (e.g., polyimide, epoxy resin, etc.) or radiation (e.g., ultraviolet, visible light or infrared radiation) curable polymer (e.g., photoresist type material, such as poly (methyl methacrylate) ("PMMA"), SU-8, poly(methyl glutarimide), etc.) which cross links or interlocks polymer chains upon being heated or irradiated to form a matrix may be used as the binder. In the various embodiments, the binder may comprise around 1-10 wt. % of the anode ink.

An optional dispersant suitable for use in the various embodiments may be any of a number of commercially available dispersants. Preferably, a non-aqueous dispersant may be used, for example, a polymeric surfactant such as Hypermer™ KD-1 (polyester/polyamine co-polymer). Other non-aqueous dispersants may include, but are not limited to, Rhodafec® RE 610 (nonylphenol ethoxylate based phosphate esters), Efka® 5044 (unsaturated polyamide and acid ester salts). In an embodiment, the dispersant may comprise 0-2 wt. %, such as around 1-2 wt. % of the anode ink.

An optional plasticizer suitable for use in the various embodiments may be any of a number of commercially available plasticizers, for example, butyl benzyl phthalate (BBP). Other plasticzers may include, but are not limited to, various phthalate-based compounds including, but not limited to, diisononyl phthalate (DINP), di-n-butyl phthalate (DnBP), etc. In an embodiment, the plasticizer may comprise 0-1 wt. %, such as 0.25-0.75 wt. % of the anode ink.

The solvent for use in the various embodiments may be any of a number of organic solvents, for example, an etidronic acid which is marketed under the name Terpineol®. Other solvents may include, but are not limited to, toluene, hexane, isopropanol, acetone, etc. In an embodiment, the solvent may comprise 5-35 wt. % of the anode ink.

In an embodiment, the composite powder may comprise around 60-80 wt. % of the anode ink. In an embodiment, the composite powder included in the abrasion resistant anode ink may be a fine powder that has a ceramic phase and a metal phase, such as a nickel-containing phase. The nickel-containing phase may be, for example, a nickel oxide (NiO) which is reduced to nickel during the firing/sintering steps described above. In an embodiment, the nickel-containing phase may be finely distributed in the ceramic phase, with an average grain size less than 1000 nanometers, such as 200-500 nm.

The nickel-containing phase may include a nickel alloy instead of or in addition to a nickel oxide. Example nickel alloys that may be used include, without limitation, nickel-cobalt (Ni—Co), nickel-copper (Ni—Cu), nickel-chromium (Ni—Cr), etc. These nickel alloys may be produced in powder form, and mixed with the ceramic phase for use in the anode printing ink.

The ceramic phase may be a doped ceria powder, such as samaria doped ceria (SDC), gadolinia doped ceria (GDC), or yttria doped ceria (YDC). Other ceramics, such as stabilized zirconia (e.g., scandia stabilized zirconia (SSZ) or yttria stabilized zirconia (YSZ)) may be used instead of or in addition to the doped ceria. In an embodiment, a composite powder of nickel oxide and samaria doped ceria (NiO-SDC) in the ink may be reduced to a nickel-samaria doped ceria (Ni-SDC) cermet in the firing and sintering steps in anode fabrication. In the various embodiments, the ceria dopant element (e.g., Sm, Gd and/or Y) may form an oxide upon incorporation into the ceria. Furthermore, the doped ceria may be non-stoichiometric, and contain more than or less than two oxygen atoms for each one metal atom.

After drying, the resulting green anode layer may have improved abrasion resistance and may be transported to completion of the cathode print cycle without creating abrasion damage and without cross-contaminating the cathode with loose powder from the unfired anode. Specifically, the embodiment unfired anode layer may be composed of nickel oxide and ceramic fine powder dispersed in a polymer binder matrix. When transported to the cathode print cycle and placed in contact with the conveyer belt, abrasion to the unfired anode may be substantially diminished or eliminated in the various embodiments.

In an embodiment, the cathode electrode 208 may also be composed of several separately deposited sublayers, such as layers 210a, 210b. The cathode electrode 208 may comprise an electrically conductive material, such as an electrically conductive perovskite material, such as lanthanum strontium manganite (LSM). Other conductive perovskites, such as lanthanum strontium cobaltite ($La,Sr)CoO_3$, lanthanum strontium cobalt ferrite, etc., or metals, such as Pt, may also be used.

During the drying and/or the co-firing of the cathode and anode electrode layers, the organic materials (i.e., plasticizer, solvent, dispersant and binder in the anode layer) may all decompose and therefore do not form part of the final solid oxide fuel cell.

In an alternative embodiment, after the anode layer is dried and prior to the cathode printing cycle, the surface of the unfired anode electrode may be coated with a lacquer layer to provide additional abrasion resistance. The lacquer layer may be, for example, a mixture of solvent (e.g., Terpineol®) and abrasion-resistant binder (e.g., Elvacite®) described above. After application of the lacquer layer in this embodiment, the substrate with anode layer may again be dried, such as in dryer 120 of FIG. 1.

While the abrasion resistance in the above embodiments are described with respect to the anode layer, in another alternative embodiment, the order of electrode formation may be reversed (i.e., cathode followed by anode), and the abrasion resistant ink properties may be incorporate into the cathode formation using similar materials and processes.

As is understood in the art, not all equipment or apparatuses are shown in the figures. For example, one of skill in the art would recognize that various holding tanks and/or pumps may be employed in the present method.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the steps as a sequential process, many of the steps can be performed in parallel or concurrently.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of making a solid oxide fuel cell (SOFC), comprising:
    forming a first electrode on a first side of a planar solid oxide electrolyte using an abrasion resistant ink;
    drying the first electrode;
    forming a second electrode on a second side of the solid oxide electrolyte prior to firing the first electrode;
    drying the second electrode; and
    firing the first and second electrodes during a single firing step;
    wherein the abrasion resistant ink comprises:
        around 60-80 wt. % of a composite powder, wherein the composite powder comprises a metal phase and a ceramic phase;
        around 1-10 wt. % of a binder, wherein the binder comprises a polymer or polymer precursor;
        zero to less than 2 wt. % of a dispersant;
        zero to less than 1 wt. % of a plasticizer; and
    wherein the ink contains 5-35% wt. % organic solvent which comprises etidronic acid.

2. A method of making a solid oxide fuel cell (SOFC), comprising:
    forming a first electrode on a first side of a planar solid oxide electrolyte using an abrasion resistant ink;
    drying the first electrode;
    forming a second electrode on a second side of the solid oxide electrolyte prior to firing the first electrode;
    drying the second electrode; and
    firing the first and second electrodes during a single firing step,
    wherein the abrasion resistant ink comprises:
        around 60-80 wt. % of a composite powder, wherein the composite powder comprises a metal phase and a ceramic phase;
        around 1-10 wt. % of a binder, wherein the binder comprises a polymer or polymer precursor;
        around 5-35% wt. % of an organic solvent;
        zero to less than2 wt. % of a dispersant; and
        zero to less than 1 wt. % of a plasticizer;
    the ceramic phase in the composite powder comprises samaria-doped ceria (SDC);
    the metal phase in the composite powder comprises nickel oxide;
    the binder comprises a derivative of methacrylic acid;
    the solvent comprises etidronic acid;
    the ink contains greater than zero wt. % of the dispersant, wherein the dispersant comprises a polyester/polyamine co-polymer; and
    the ink contains greater than zero wt. % of the plasticizer, wherein the plasticizer comprises butyl benzyl phthalate (BBP).

3. The method of claim 2, wherein the binder comprises an acrylic polymer, ethyl cellulose, polyvinyl alcohol, or polyvinyl butyral.

4. A method of making a solid oxide fuel cell (SOFC), comprising:
    forming a first electrode on a first side of a planar solid oxide electrolyte using an abrasion resistant ink;
    drying the first electrode;
    forming a second electrode on a second side of the solid oxide electrolyte prior to firing the first electrode;
    drying the second electrode;
    firing the first and second electrodes during a single firing step; and
    forming a top coat over the first electrode, wherein the top coat comprises a lacquer layer that comprises etidronic acid and a derivative of methacrylic acid.

* * * * *